(12) United States Patent
Kale et al.

(10) Patent No.: US 11,197,412 B2
(45) Date of Patent: Dec. 14, 2021

(54) AUTOMATIC RANK SELECTION

(71) Applicant: Deere & Company, Moline, IL (US)

(72) Inventors: Mandar Mhalsakant Kale, Pune (IN); Sandeep Ekhe, Ahmednagar (IN); Ashish Paralikar, Pune (IN); Manoj Issrani, Pune (IN); Rahul S. Khairnar, Nashik (IN); Saravanan Stallin, Chennai (IN)

(73) Assignee: DEERE & COMPANY, Moline, IL (US)

( * ) Notice: Subject to any disclaimer, the term of this patent is extended or adjusted under 35 U.S.C. 154(b) by 187 days.

(21) Appl. No.: 16/535,952

(22) Filed: Aug. 8, 2019

(65) Prior Publication Data

US 2021/0037698 A1 Feb. 11, 2021

(51) Int. Cl.
*A01C 7/20* (2006.01)
*A01B 49/06* (2006.01)
(Continued)

(52) U.S. Cl.
CPC .............. *A01C 7/20* (2013.01); *A01B 49/06* (2013.01); *A01B 63/008* (2013.01); *A01B 76/00* (2013.01);
(Continued)

(58) Field of Classification Search
CPC .. A01C 7/20; A01C 5/062; A01C 7/08; A01C 21/00; A01C 7/00; A01C 5/06;
(Continued)

(56) References Cited

U.S. PATENT DOCUMENTS 7,213,617 B2 5/2007 Snipes et al.
7,726,251 B1 6/2010 Peterson et al.
(Continued)

FOREIGN PATENT DOCUMENTS

CA 2902922 A1 3/2016
WO WO 2013/105021 A1 7/2013

OTHER PUBLICATIONS

Lock-Up Rockshafts and Openers, http://manuals.deere.com/omview/OMA85521_19/OUO6030_00003CC_19_01MAR05_1.htm, available at least as early as May 16, 2019 (1 page).
(Continued)

*Primary Examiner* — Christopher J. Novosad
(74) *Attorney, Agent, or Firm* — Michael Best & Friedrich, LLP (57) ABSTRACT

A controller communicates with a user interface and sends a first signal to a first actuator to unlock a first lock, sends a second signal to move a first ground-engaging implement into a stowed position, sends a third signal to the first actuator to lock first lock to retain the first ground-engaging implement in the stowed position, sends a fourth signal to inhibit flow through a first hose with a flow blocking element, sends a fifth signal to a second actuator to unlock a second lock, sends a sixth signal to move a second ground-engaging implement into a deployed position, sends a seventh signal to the second actuator to lock the second lock to retain the second ground-engaging implement in the deployed position, and sends an eighth signal to a second flow blocking element to permit flow through a second hose around the flow blocking element.

20 Claims, 10 Drawing Sheets

(51) Int. Cl.
*A01B 63/00* (2006.01)
*A01B 76/00* (2006.01)
*A01C 5/06* (2006.01)
*A01C 7/08* (2006.01)
*A01C 21/00* (2006.01)

(52) U.S. Cl.
CPC ............... *A01C 5/062* (2013.01); *A01C 7/08* (2013.01); *A01C 21/00* (2013.01)

(58) Field of Classification Search
CPC ......... A01C 5/00; A01B 49/06; A01B 63/008; A01B 76/00; A01B 49/04; A01B 49/00; A01B 63/002; A01B 63/00
See application file for complete search history.

(56) References Cited

U.S. PATENT DOCUMENTS

| | | | |
|---|---|---|---|
| 8,079,317 | B2 | 12/2011 | Anderson et al. |
| 2007/0079883 | A1 | 4/2007 | Snipes et al. |
| 2009/0078178 | A1* | 3/2009 | Beaujot ............... A01C 21/005 111/170 |
| 2012/0298024 | A1 | 11/2012 | Naylor |

OTHER PUBLICATIONS

Opening and Closing Opener Hydraulic Lock-Up Valve, http://manuals.deere.com/omview/OMA85521_19/OUMX005_0001B6C_19_01MAR05_1.htm, available at least as early as May 16, 2019 (1 page).

Opener Components and Adjustments, http://manuals.deere.com/omview/OMA85521_19/OUO6023_0001690_19_30SEP05_1.htm, available at least as early as May 16, 2019 (1 page).

Magnetic, Turck, 2019, https://pdb2.turck.de/us/DE/groups/000000000001096d00060023, available at least as early as May 16, 2019 (3 pages).

Extended European Search Report and Written Opinion issued in European Patent Application No. 20189626.3, dated Jan. 14, 2021, in 11 pages.

* cited by examiner

AUTOMATIC RANK SELECTION

BACKGROUND

The present disclosure relates to selection of one or more ranks in a work vehicle.

SUMMARY

In one embodiment, the disclosure provides a work vehicle including a frame, a ground-engaging implement connected to the frame to support the frame above a ground surface, a hopper configured to retain a commodity, and a first ground-opening implement that opens the ground surface. The first ground-opening implement is connected to the frame for movement with respect to the frame between a first stowed position and a first deployed position. A first lock retains the first ground-opening implement in the first stowed position and in the first deployed position. A first actuator opens the first lock to permit the first ground-engaging implement to move between the first stowed position and the first deployed position, and closes the first lock to retain the first ground-engaging implement in a selected one of the first stowed position and the first deployed position. A first hose is connected to the hopper to deliver the commodity to the ground surface adjacent the first ground-opening implement. A first flow blocking element inhibits flow through the first hose in a first position and permits flow through the first hose in a second position. A second ground-opening implement opens the ground surface and is connected to the frame for movement with respect to the frame between a second stowed and a second deployed position. A second lock retains the second ground-opening implement in the second stowed position and in the second deployed position. A second actuator opens the second lock to permit the second ground-engaging implement to move between the second stowed position and the second deployed position, and closes the second lock to retain the second ground-engaging implement in a selected one of the second stowed position and the second deployed position. A second hose is connected to the hopper to deliver the commodity to the ground surface adjacent the second ground-opening implement. A second flow blocking element inhibits flow through the second hose in a first position and permits flow through the second hose in a second position. A user interface receives an input from the user and a controller is in communication with the user interface. In response to the input from the user, the controller sends a first signal to the first actuator to lock and unlock the first lock, sends a second signal to the second actuator to lock and unlock the second lock, sends a third signal to the move the first flow blocking element between the first position and the second position, and sends a fourth signal to the move the first flow blocking element between the first position and the second position.

In another embodiment the disclosure provides a method of rank selection and seed flow control of a work vehicle. The method includes raising an unselected rank with a first actuator in response to input from a user via a user interface, and retaining the unselected rank in a raised position with a first lock in response to input from the user via the user interface. The method further includes moving a first flow blocking element into a closed position in response to input from the user via the user interface, and inhibiting flow of a commodity to the unselected rank through a first hose with the first flow blocking element. The method further includes lowering a selected rank with a second actuator in response to input from the user via the user interface, and retaining the selected rank in a lowered position with a second lock in response to input from the user via the user interface. The method further includes moving a second flow blocking element into an open position in response to input from the user via the user interface, permitting flow of the commodity to the selected rank through a second hose with the second flow blocking element, and moving the commodity from a hopper through the second hose to a ground surface.

In another embodiment, the disclosure provides a control system including a user interface that receives an input from the user, and a controller in communication with the user interface. In response to the input from the user, the controller sends a first signal to a first actuator to unlock a first lock, sends a second signal to a first ground-engaging implement to move the first ground-engaging implement into a stowed position, sends a third signal to the first actuator to lock first lock to retain the first ground-engaging implement in the stowed position, sends a fourth signal to a first flow blocking element to inhibit flow through a first hose with a flow blocking element, sends a fifth signal to a second actuator to unlock a second lock, sends a sixth signal to a second ground-engaging implement to move the second ground-engaging implement into a deployed position, sends a seventh signal to the second actuator to lock the second lock to retain the second ground-engaging implement in the deployed position, and sends an eighth signal to a second flow blocking element to permit flow through a second hose around the flow blocking element.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
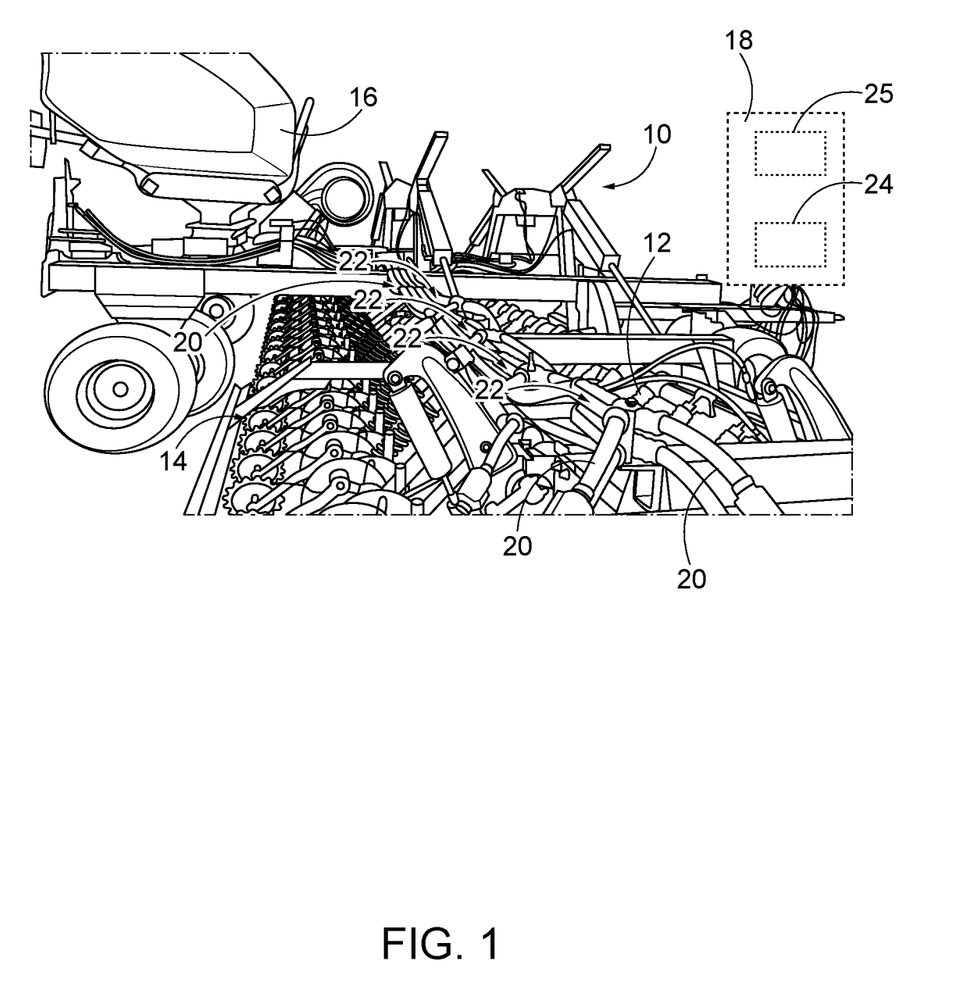
FIG. 1 is a perspective view of a work vehicle according to some embodiments.

FIG. 1 illustrates a seeder machine 10 having a front seeding rank 12, a rear seeding rank 14, a hopper 16, an operator cab 18, a plurality of hoses 20, a plurality of splitters 22, a controller 24 and a user interface 25. The seeder machine 10 is supported by a plurality of ground-engaging implements (such as wheels or tracks). The front seeding rank 12 and the rear seeding rank 14 each have a plurality of ground-opening implements configured to open the ground, position one or more seeds into the open ground, and close the ground after positioning the one or more seeds into the open ground. The seeder machine 10 is configured to move along a ground surface such that the plurality of ground-opening implements open the ground, position one or more seeds in the ground, and close the ground after positioning the one or more seeds into the open ground.

The plurality of hoses 20 are fluidly connected to the hopper 16 to direct seeds from the hopper 16 to the plurality of splitters 22. A blower or other motive force is utilized to move the seeds through the plurality of hoses 20. The splitters 22 divide the flow through one of the hoses 20 to two separate outlets. In the illustrated embodiment, the splitters 22 direct flow to one outlet in the front seeding rank 12 and direct flow to one outlet in the rear seeding rank 14.

Figure 2:
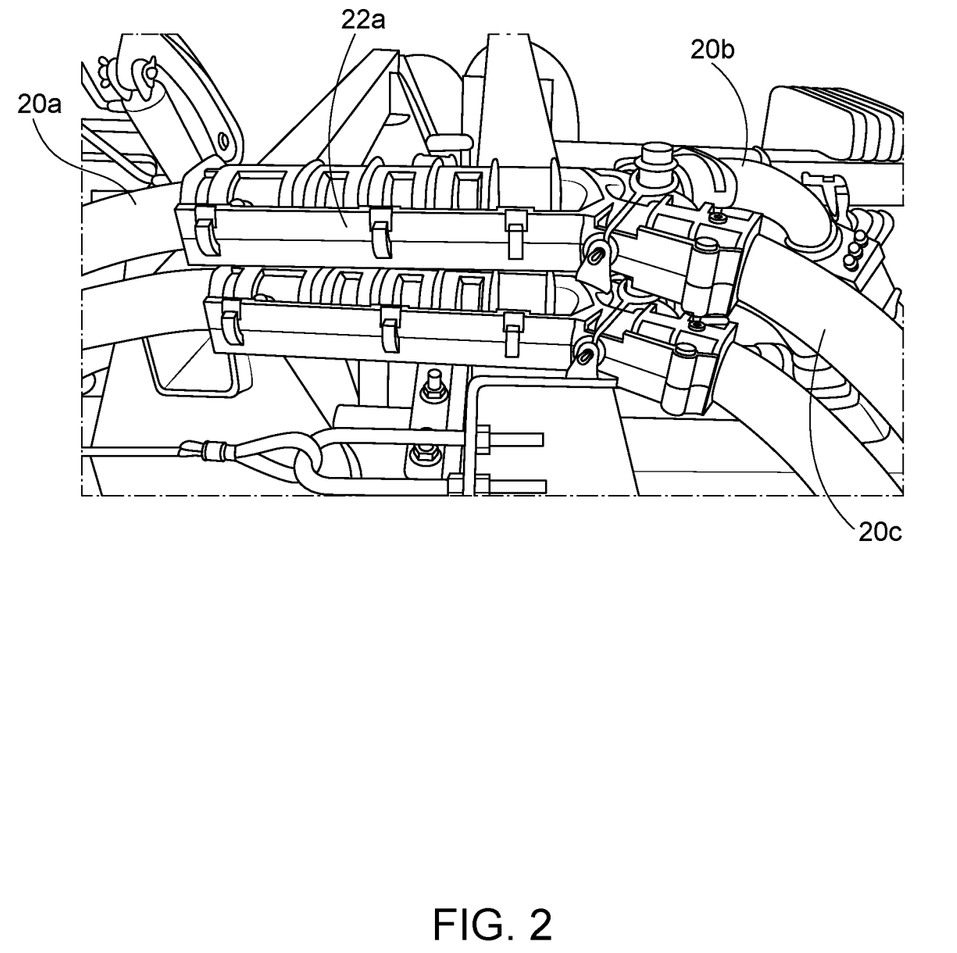
FIG. 2 is a perspective view of a splitter and hoses.

FIG. 2 illustrates splitter 22. A first hose 20a is connected an inlet 22a of the splitter 22, a second hose 20b is connected to a first outlet 22b of the splitter 22, and a third hose 20c is connected to a second outlet 22c of the splitter 22. The first hose 20a is configured to receive a commodity (such as seed) from the hopper 16 and direct the seeds into the inlet 22a of the splitter 22. Seed is then split between the second hose 20b (via the first outlet 22b) and the third hose 20c (via the second outlet 22c) and directed to the ground-opening implements which plant the seed in a ground surface. The illustrated second hose 20b is in the front seeding rank 12 and the illustrated third hose 20c is in the rear seeding rank 14.

Figure 3:
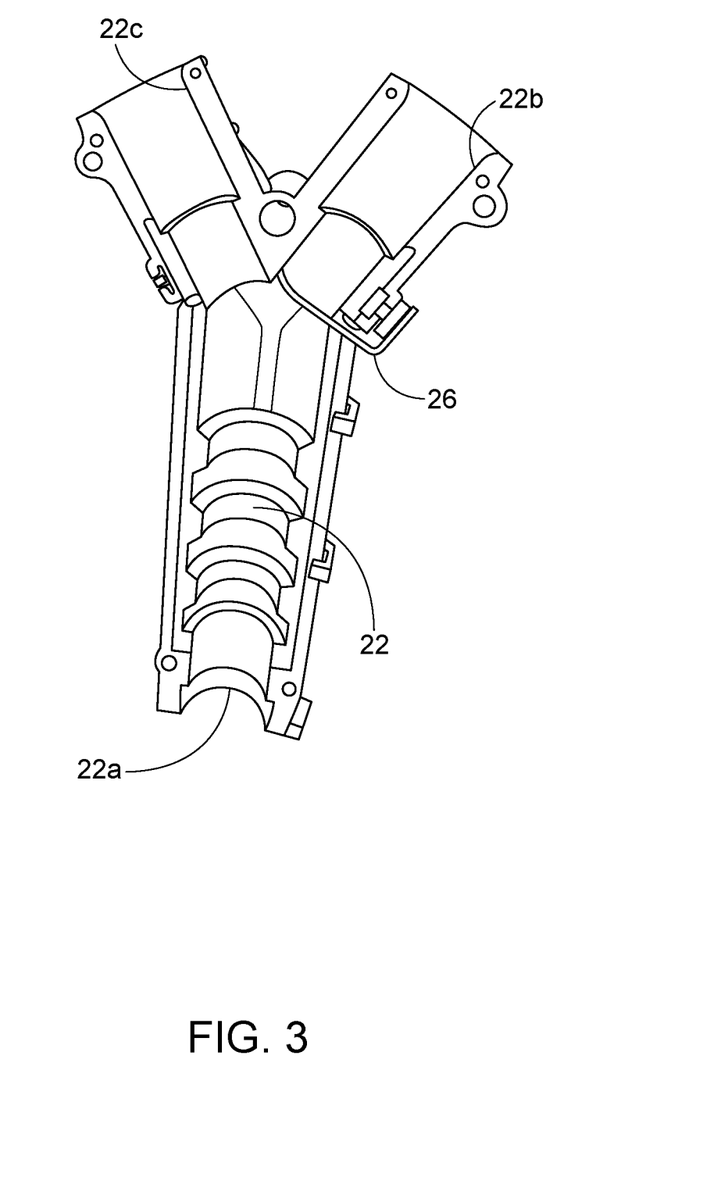
FIG. 3 is a top view of the splitter.

FIG. 3 illustrates a flow blocking element 26 that includes a metal clip. The illustrated flow blocking element 26 is inserted into the first outlet 22b of the splitter 22 to block flow of seed though the first outlet 22b and therefore block flow through the second hose 20b. The same flow blocking element 26 can be removed and inserted into the second outlet 22c of the splitter 22 to block flow of seed through the second outlet 22c to thereby block flow of seed through the third hose 20c. In some embodiments, the flow blocking element 26 is removed to thereby permit flow through the first outlet 22b and the second outlet 22c of the splitter.

Figure 4:
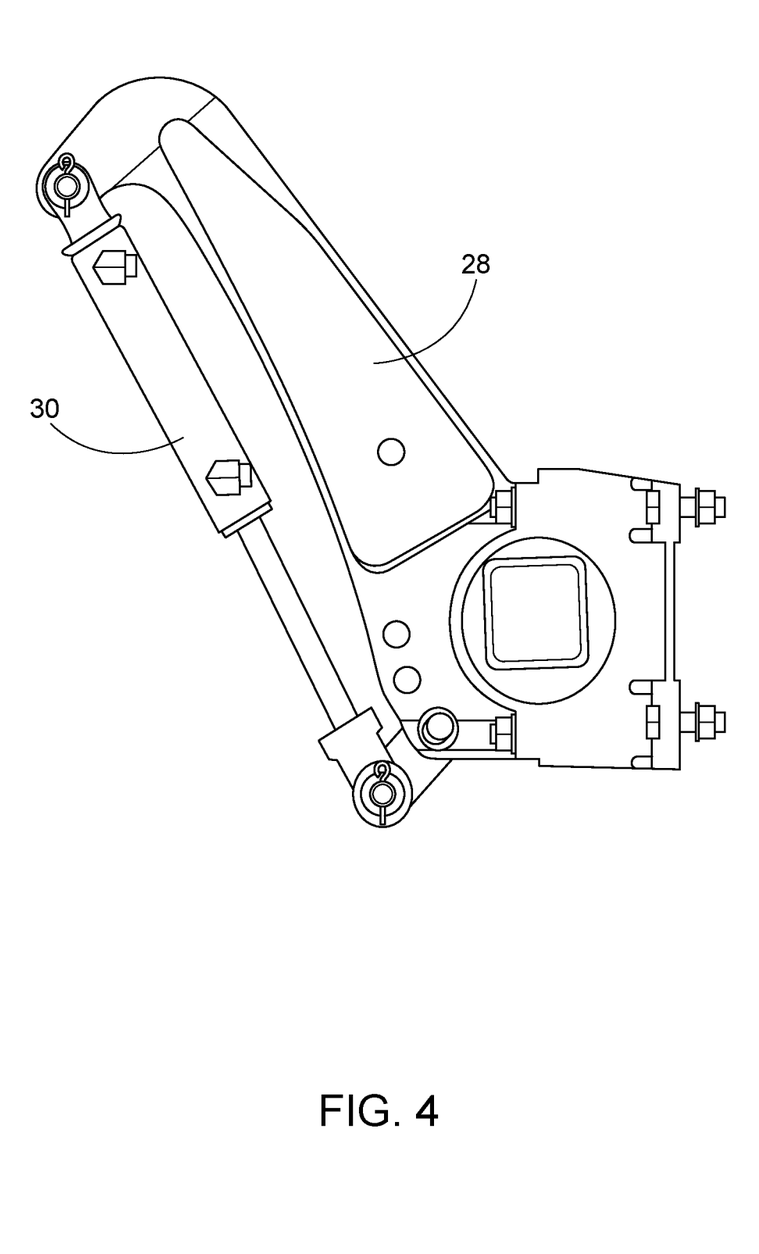
FIG. 4 is a side view of the actuator and lock.

FIG. 4 illustrates one link support arm 28 and one height adjustment arm 30. A first ground of link support arms 28 and height adjustment arms 30 are connected to the front seeding rank 12 and a second ground of link support arms 28 and height adjustment arms 30 are connected to the rear seeding rank 14. The front and rear seeding ranks 12, 14 can be used independently by either being raised when not in use or lowered to be used for seeding. The first group of link supports arms 28 and height adjustment arms 30 are positioned on the front seeding rank 12 to retain the front seeding rank 12 in the lowered, raised and transport positions respectively. FIG. 4 specifically illustrates three apertures on the link support arm 28 for the lowered, raised and transportation positions, respectively. The illustrated height adjustment arm 39 is connected to the bottom-most aperture on the link support arm 28, which corresponds to the lowered position. The second group of link support arms 28 and height adjustment arms 30 are positioned on the rear seeding rank 14 to retain the rear seeding rank 14 in the lowered, raised and transport positions, respectively.

When one of the front seeding rank 12 and rear seeding rank 14 is raised, flow blocking elements 26, such as metal clip in FIG. 3, are inserted into the portions of the seed splitters 22 associated with the raised rank 12, 14 to block flow through the portions of the seed splitters 22 directing flow to the raised rank 12, 14. For example, when the front seeding rank 12 is raised, flow blocking elements 26 (such as the metal clip) are inserted into each of the first outlets 22b of the splitters 22. When the rear seeding rank 14 is raised, flow blocking elements 26, such as the metal clip, are inserted into each of the second outlets 22c of the splitters 22. When both the front seeding rank 12 and the rear seeding rank 14 are lowered, no flow blocking elements are utilized.

Changing rank position has been a manual process which involves much labor and time to accomplish. It often takes at least thirty minutes to one hour to perform the following steps:
1) Raise the rank which will not be used and lock the unused rank with a mechanical lock, such as link support arm 28 and height adjustment arm 30,
2) Block seed flow by inserting a flow blocking element 26, such as metal clip, into the portion of the seed splitter 22 associated with the unused rank on each row,
3) Change the setting in the software, and
4) Run machine and monitor seed flow to ensure seeds are received on correct rows and not received on the unused rank.

This process is time consuming and labor-intensive for the operator as multiple link support arms 28 and height adjustment arms 30 need to be adjusted and multiple seed splitters 22 need flow blocking elements 26 installed. Further, the seed splitter 22 is a mechanical device which does not guarantee the 50-50% seed flow between front and rear ranks 12, 14. In some configurations, one of the ranks 12, 14 may get around 7-10% extra seeds than the other one of the ranks 12, 14. When both ranks 12 and 14 are selected and no flow blocking elements 26 are installed, it is typically desired to divide the flow evenly between the front rank 12 and the rear rank 14.

One possible method for automating rank selection and seed blocking permits the operator to select one or both of the front rank 12 and the rear rank 14 from the cab 18. In response to the operator selecting one or both of the front rank 12 and the rear rank 14, the selected rank(s) move into the lowered position, the unselected rank moves into the raised position, and seed is inhibited from entering the unselected rank but is permitted to enter the selected rank. The ranks can move either prior to, concurrent with, or after flow through the unselected ranks is blocked. In some embodiments, the method also provides the operator with the ability to balance the seed flow between the ranks in the event that both the front rank 12 and the rear rank 14 are selected.

The method includes the following steps:
1. Navigate to setup screen for rank selection on the user interface 25. The operator selects one or both of the front seeding rank 12 and the rear seeding rank 14. This step occurs first.
2. The controller 24 ensures that all meters are stopped and that the machine is not moving. This step occurs second.
3. The controller 24 sends signals to the height adjustment arms 30 to lower the selected rank(s) and to raise the unselected rank.
4. The controller 24 sends signals to actuators to lock the selected rank(s) in the lowered position and to lock the unselected rank in the raised position. This step occurs after step 3.
5. The controller 24 sends signals to the flow blocking elements 26 to permit or inhibit seed flow through the splitter outlets 22b, 22c based upon the rank selection of the operator. This step can occur before step 3, during step 3, during step 4 or after step 4.

6. The controller 24 provides confirmation that the ranks 12 and 14 are locked in the desired position and the flow blocking elements are in the desired position to permit operation to continue. The controller 24 also notifies the user via the user interface 25 when the process is complete.

Figure 5:
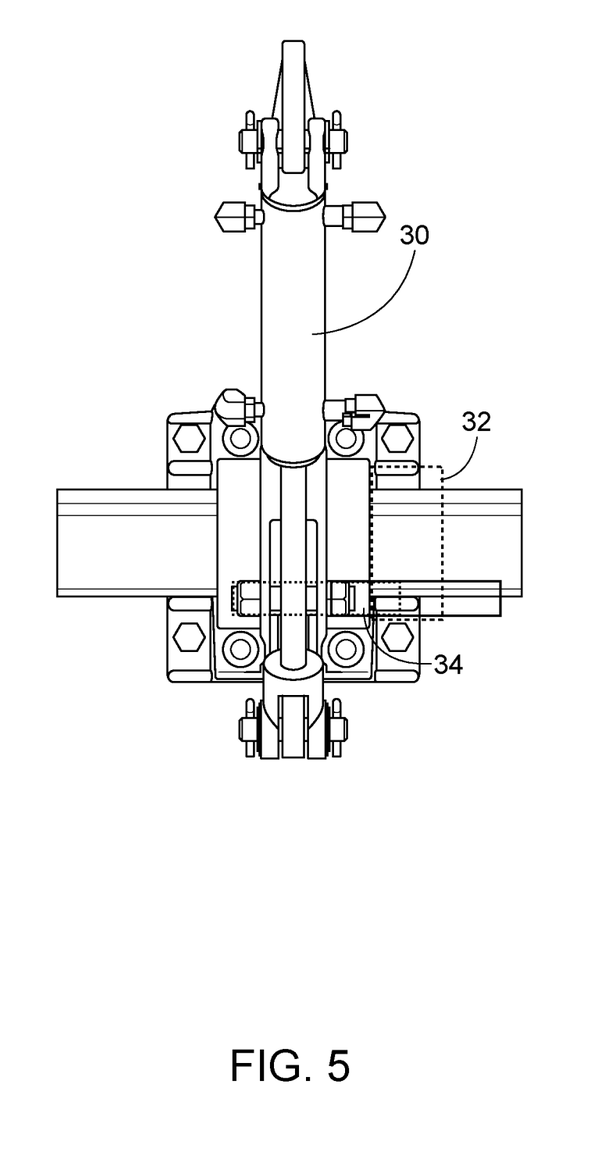
FIG. 5 is a front view of the actuator and lock.

FIG. 5 illustrates an actuator 32 connected to the height adjustment arm 30 and a plunger 34 that is moved by the actuator 32. The illustrated plunger 34 is moveable between a retracted or unlocked position (shown in solid lines) and a protruding or locked position (shown in phantom lines). The actuator 32 moves the plunger 34 axially in response to one or more signals from the controller 24.

Figure 6:
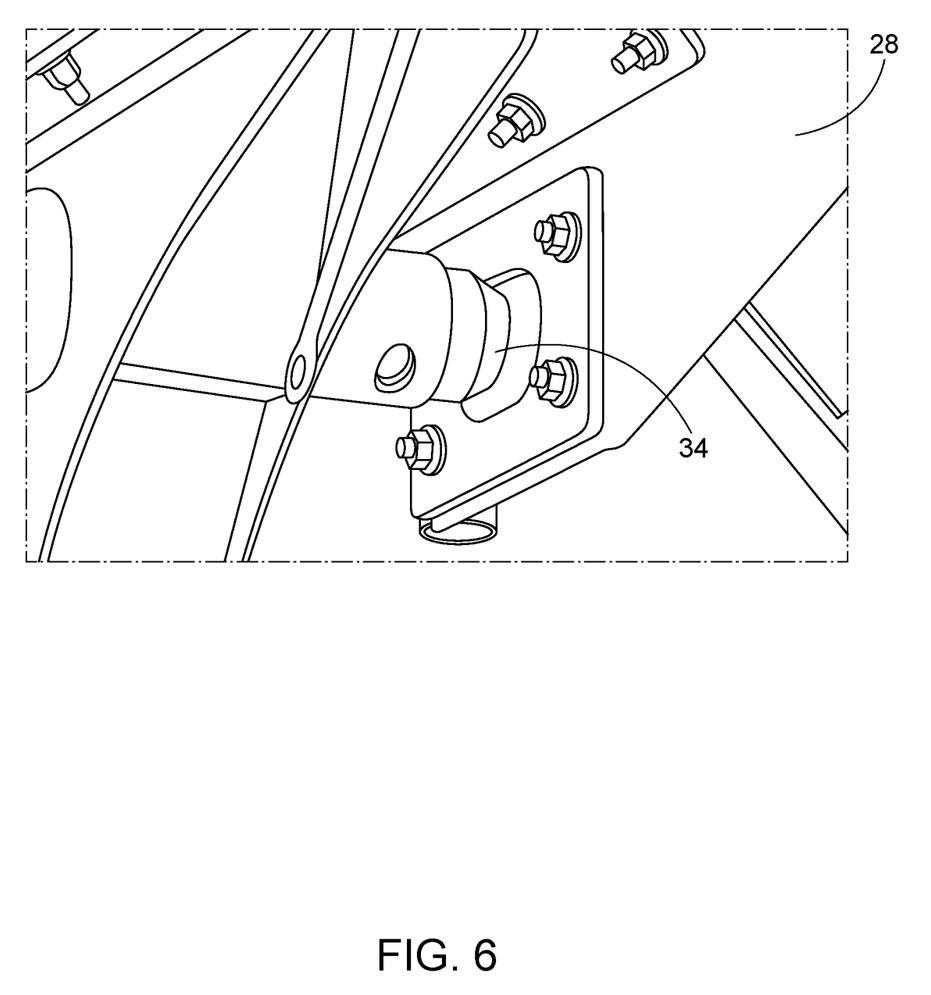
FIG. 6 is a close up view of the lock.

FIG. 6 illustrates the plunger 34 in alignment with one of the apertures on the link support arm 28. The height adjustment arm 30 and the plunger 34 are moved in response to one or more signals from the controller 24. In some embodiments, one or more proximity sensors and/or cameras are included near the plunger 34 to confirm that the plunger 34 is adjacent one of the apertures on the link support arm 28 prior to the plunger 34 being moved into the protruding position.

Figure 7:
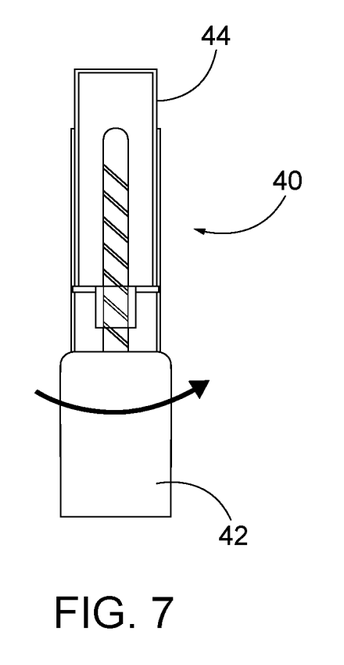
FIG. 7 is a side view of one embodiment of a flow blocking element.

After the selected rank(s) have been moved into the lowered position and the unselected rank (if any) has been moved into the raised position, the seed flow to the unselected rank (if any) needs to be inhibited. Seeds can be blocked at the splitter level or at the meter level. FIG. 7 illustrates one of the possible splitter flow blocking elements as a linear actuator 40. The linear actuator 40 includes a motor 42 and a linearly moving portion 44 that can extend across one outlet (22b or 22c) of the splitter 22 to inhibit flow through the respective outlet of the splitter 22. The motor 42 is electrically connected to the controller 24 to extend or retract the linearly moving portion 44 based upon the signal from the controller 24. A first linear actuator 40 is positioned in the first outlet 22b of the splitter 22 and a second linear actuator 40 is positioned in the second outlet 22c of the splitter 22. In some embodiments, the controller 24 can send a signal to the linear actuators 40 to move the respective linearly moving portion 44 to positions between fully extended and fully retracted to adjust the flow balance between the two outlets of the splitter 22. The flow through the first outlet 22b and the second outlet 22c can be balanced by moving one or both of the linearly moving portions 44 to positions between fully extended and fully retracted. For example, if the user interface 25 indicates that 60% of the flow is moving through the first outlet 22b, the operator can moving the linearly moving portion 44 to block a portion of the first outlet 22b to thereby direct more of the flow to the second outlet 22c. This can enable the user to achieve an approximately balanced flow between the first outlet 22b and the second outlet 22c.

Figure 8:
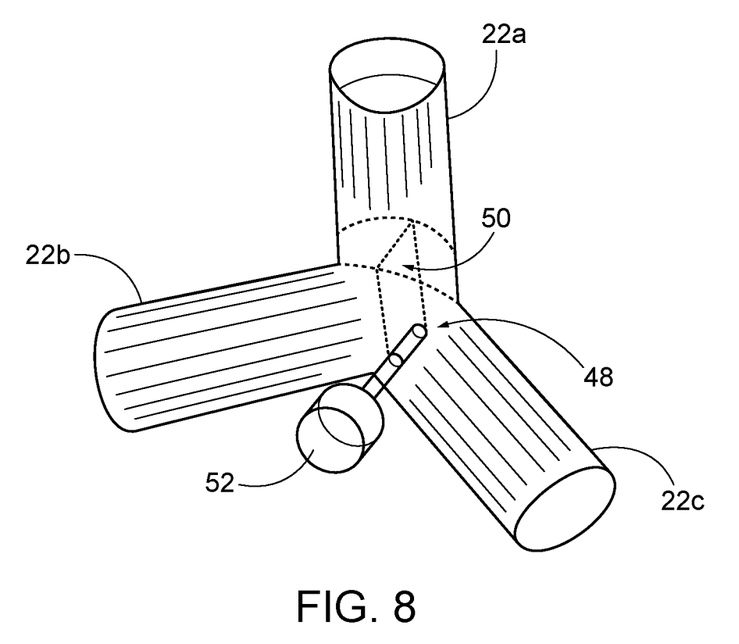
FIG. 8 is a perspective view of one embodiment of a flow blocking element.

FIG. 8 illustrates another splitter flow blocking element 48 that includes a rotating plate 50 that can rotate the rotating plate 50 between a first end position in which flow through the first outlet 22b is completely inhibited, a second end position in which flow though the second outlet 22c is completely inhibited and an number of positions between the first end position and the second end position. A motor 52 is electrically connected to the controller 24 to rotate the rotating plate 50 based upon a signal from the controller 24. In some embodiments, the controller 24 can send a signal to the rotating plate 50 to rotate the rotating plate 50 to positions between the first end position and the second end position to adjust the flow balance between the two outlets 22b, 22c of the splitter 22.

Figure 9:
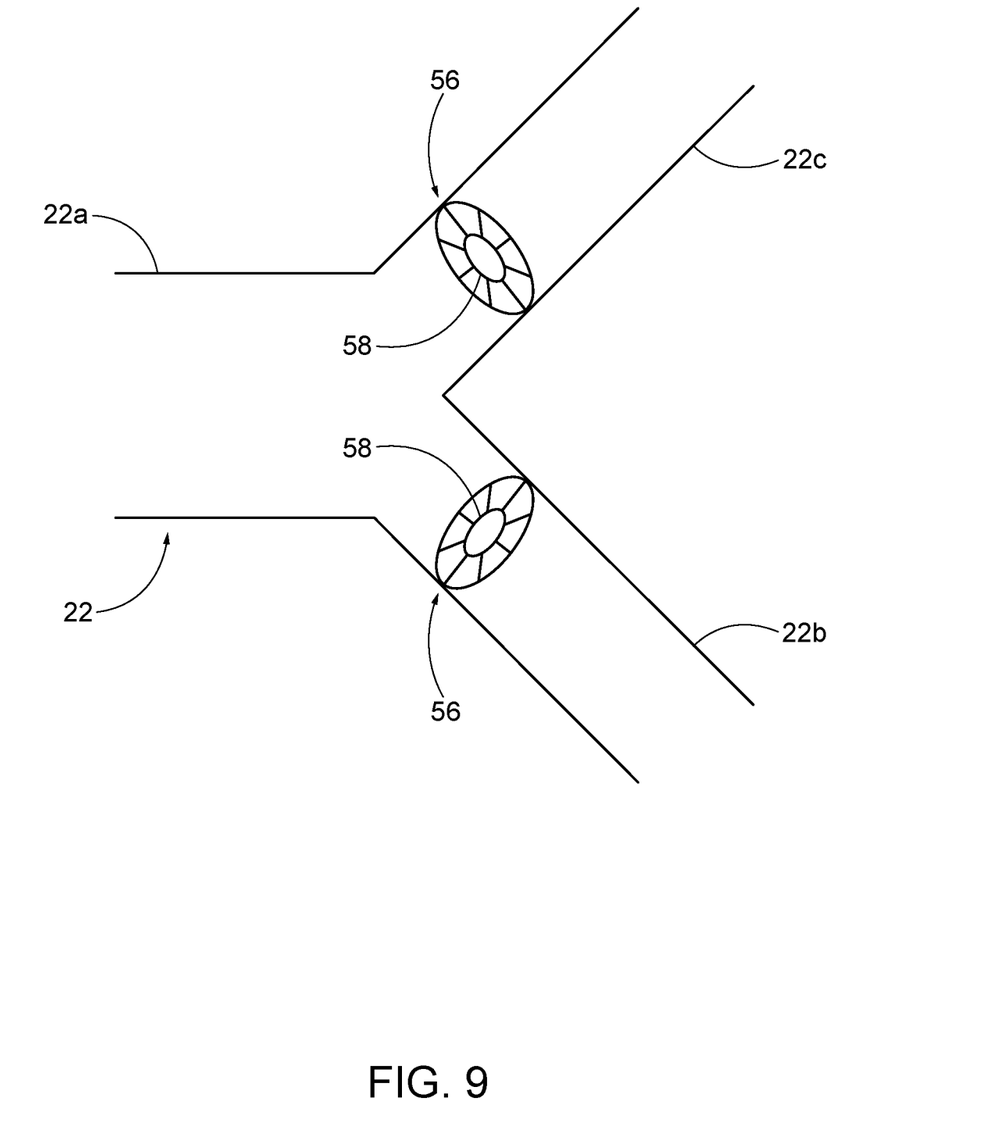
FIG. 9 is a side schematic view of one embodiment of a flow blocking element.

FIG. 9 illustrates another possible flow blocking element 56 that includes a variable orifice 58. The variable orifice 58 of the flow blocking element 56 includes a plurality of moving sections that move between a fully open and a fully closed position. One flow blocking element 56 is positioned in the first outlet 22b and one flow blocking element 56 is positioned in the second outlet 22c. A motor is electrically connected to the controller 24 to move the moving sections of the respective variable orifices 58 based upon signals from the controller 24. The variable orifices 58 are separately controlled, such that the variable orifice 58 in the first outlet 22b can be opened or closed separately from the variable orifice 58 in the second outlet 22c being opened or closed. In some embodiments, the controller 24 can send signals to one or both of the variable orifice flow blocking elements 56 to move the respective moving sections of the variable orifices 58 to positions between the fully open position and the fully closed position to adjust the flow balance between the first and second outlets 22b, 22c of the splitter 22.

The flow blocking elements 40, 48 and 56 shown in FIGS. 7-9 permit each row to be controlled independently at the respective splitters 22. The flow blocking elements 40, 48 and 56 also permit the user to adjust the flow of seeds through the first and second outlets 22b, 22c of the splitters 22 to the front rank 12 and to the rear rank 14 to achieve the desired split of seeds between ranks (i.e., fifty percent of the seeds to the front rank 12 and fifty percent of seeds to the rear rank 14).

Figure 10:
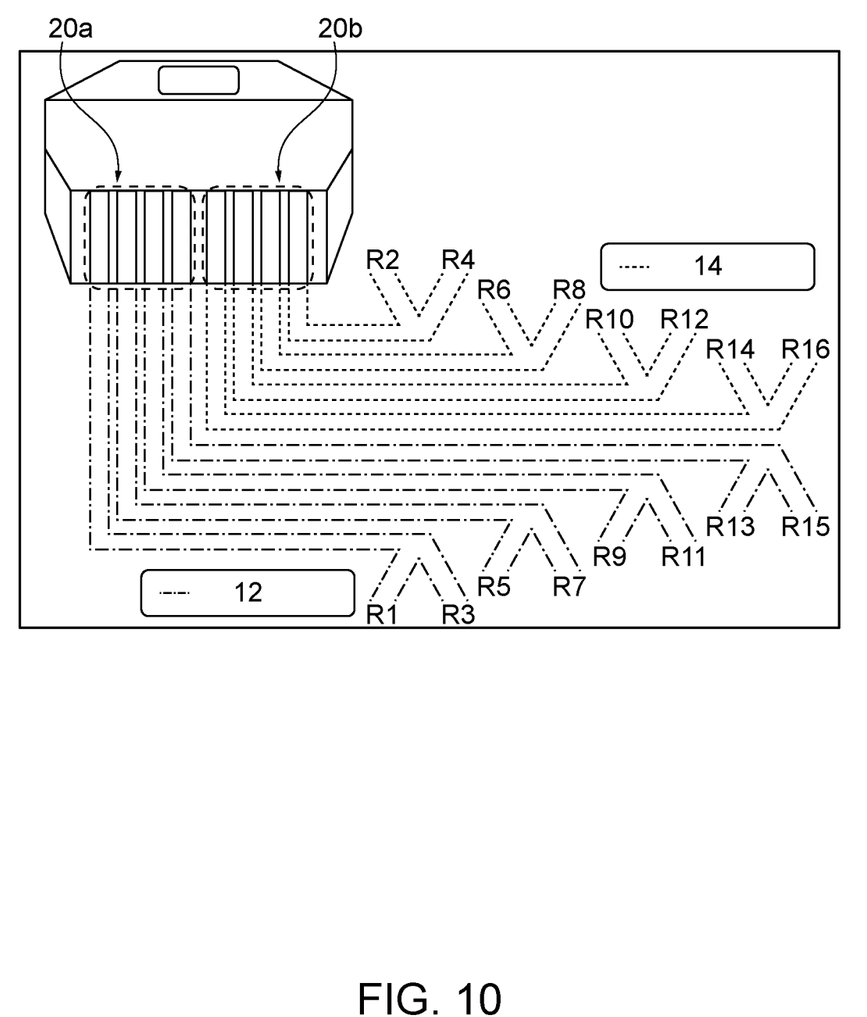
FIG. 10 is a schematic view of a hose configuration according to some embodiments.

FIG. 10 illustrates another possible flow blocking configuration in which the hoses 20 are routed such that a first set of hoses 20a is dedicated to the front rank 12 and a second set of hoses 20b is dedicated to the rear rank 14. The splitters 22 direct seed flow to two adjacent rows of the same rank (i.e. to the front rank 12 or to the rear rank 14). For example, a first one of the first group of hoses 20a directs flow to a first outlet R1 and a second outlet R3, which are both positioned in the front rank 12. In the illustrated embodiments, the first set of hoses 20a includes four hoses directing flow to eight outlets in the front rank 12 and the second set of hoses 20b includes four hoses directing flow to eight outlets in the rear rank 14. Other quantities and configurations of hoses 20 and splitters 22 are possible.

Figure 11:
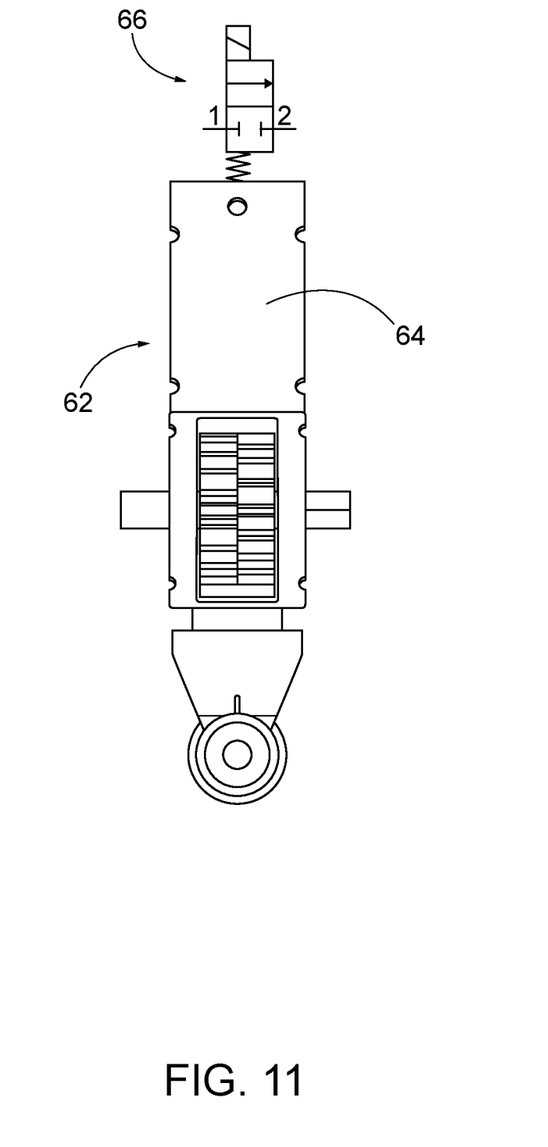
FIG. 11 is a schematic view of a flow meter and a gate.

FIG. 11 illustrates another flow blocking element 62 which is a moving plate 64 positioned at a wall of the hopper 16 adjacent each of the first set of hoses 20a and adjacent each of the second set of hoses 20b to block flow through the respective hose 20. The moving plate 64 of the flow blocking element 62 is moved between a closed position and an open position by an actuator 66. The actuator 66 is electrically connected to the controller 24 to move the moving plate 64 of the flow blocking element 62 between the closed position and the open position based upon a signal from the controller 24.

In some embodiments, one or more sensors are positioned adjacent the moving plate 64 of the flow blocking element 62 to confirm the position of the moving plate 64. The sensor can be a proximity sensor, a magnetic sensor or other suitable sensor. The sensor is electrically connected to the controller 24 to provide confirmation of the position of the respective moving plate flow 64 to the user.

The present disclosure automates a previously manual process to greatly reduce the time and effort required by the user to raise or lower the desired ranks and to block flow through the hoses in the unused ranks. Specifically, the user can raise or lower the desired ranks, lock the ranks in the desired position, and block flow through the hoses in the unused ranks all from the cab of the work vehicle. In some configurations, a flow balance of seeds between the front rank 12 and the rear rank 14 can be adjusted and controlled by a user from the cab 18 of the seeder machine 10.

What is claimed is:

1. A work vehicle comprising:
a frame;
a ground-engaging implement connected to the frame and configured to support the frame above a ground surface;
a hopper configured to retain a commodity;
a first ground-opening implement configured to open the ground surface, the first ground-opening implement connected to the frame for movement with respect to the frame between a first stowed position and a first deployed position;
a first height adjustment arm coupled to the frame and to the first ground-opening implement, the first height adjustment arm configured to move the first ground-opening implement between the first stowed position and the first deployed position;
a first lock configured to selectively retain the first ground-opening implement in the first stowed position and in the first deployed position;
a first actuator configured to open the first lock to permit the first ground-engaging implement to move between the first stowed position and the first deployed position, and to close the first lock to retain the first ground-engaging implement in a selected one of the first stowed position and the first deployed position;
a first hose connected to the hopper and configured to deliver the commodity to the ground surface adjacent the first ground-opening implement;
a first flow blocking element configured to inhibit flow through the first hose in a first position and configured to permit flow through the first hose in a second position;
a second ground-opening implement configured to open the ground surface, the second ground-opening implement connected to the frame for movement with respect to the frame between a second stowed position and a second deployed position;
a second height adjustment arm coupled to the frame and to the second ground-opening implement, the second height adjustment arm configured to move the second ground-opening implement between the second stowed position and the second deployed position;
a second lock configured to selectively retain the second ground-opening implement in the second stowed position and in the second deployed position;
a second actuator configured to open the second lock to permit the second ground-engaging implement to move between the second stowed position and the second deployed position, and to close the second lock to retain the second ground-engaging implement in a selected one of the second stowed position and the second deployed position;
a second hose connected to the hopper and configured to deliver the commodity to the ground surface adjacent the second ground-opening implement;
a second flow blocking element configured to inhibit flow through the second hose in a first position and permit flow through the second hose in a second position;
a user interface configured to receive an input from a user; and a controller in communication with the user interface such that in response to the input from the user, the controller configured to
send a first signal to the first actuator to lock and unlock the first lock,
send a second signal to the second actuator to lock and unlock the second lock,
send a third signal to the move the first flow blocking element between the first position and the second position, and
send a fourth signal to the move the second flow blocking element between the first position and the second position.

2. The work vehicle of claim 1, wherein the controller is further configured to send a fifth signal to the first flow blocking element to move the first flow blocking element to a partially-opened position, and configured to send a sixth signal to the second flow blocking element to move the second flow blocking element to a partially-opened position.

3. The work vehicle of claim 2, wherein the first flow blocking element is positioned at a location remote from a wall of the hopper.

4. The work vehicle of claim 1, wherein the first flow blocking element is positioned adjacent a wall of the hopper to inhibit flow of commodity out of the hopper through the first hose when the first flow blocking element is in the first position.

5. The work vehicle of claim 1, wherein the second flow blocking element is positioned adjacent a wall of the hopper to inhibit flow of commodity out of the hopper through the second hose when the second flow blocking element is in the first position.

6. The work vehicle of claim 1, wherein the first flow blocking element is positioned at a location remote from a wall of the hopper, wherein the first ground-opening implement is connected to the frame via a support arm, wherein the first lock includes a first plunger configured to extend into a first aperture in the support arm to retain the first ground-opening implement in the first stowed position, and wherein the first plunger is configured to extend into a second aperture in the support arm to retain the first ground-opening implement in the first deployed position.

7. The work vehicle of claim 1, further comprising a splitter positioned between the hopper and the first hose and between the hopper and the second hose such that commodity is configured to flow from the hopper and through the splitter to the first hose and to the second hose.

8. The work vehicle of claim 7, wherein the first flow blocking element is connected to a first outlet of the splitter such that flow through the first outlet of the splitter into the first hose is inhibited when the first flow blocking element is in the first position and is permitted when the first flow blocking element is in the second position, and
wherein the second flow blocking element is connected to a second outlet of the splitter such that flow through the second outlet of the splitter into the second hose is inhibited when the second flow blocking element configured is in the first position and is permitted when the second flow blocking element is in a second position.

9. A method of rank selection and seed flow control of a work vehicle, the method comprising:
raising an unselected rank with a first actuator in response to input from a user via a user interface;
retaining the unselected rank in a raised position with a first lock in response to input from the user via the user interface;

moving a first flow blocking element into a closed position in response to input from the user via the user interface;

inhibiting flow of a commodity to the unselected rank through a first hose with the first flow blocking element;

lowering a selected rank with a second actuator in response to input from the user via the user interface;

retaining the selected rank in a lowered position with a second lock in response to input from the user via the user interface;

moving a second flow blocking element into an open position in response to input from the user via the user interface;

permitting flow of the commodity to the selected rank through a second hose with the second flow blocking element; and moving the commodity from a hopper through the second hose to a ground surface.

10. The method of claim 9, wherein the user interface is positioned within a cab of the work vehicle, wherein retaining the unselected rank in the raised position with the first lock includes extending a plunger into a first aperture, and wherein prior to raising the unselected rank, retracting the plunger from a second aperture to permit movement of the unselected rank to the raised position.

11. The method of claim 9, further comprising moving a third flow blocking element into a closed position in response to input from the user via the user interface;

inhibiting flow of a commodity through a third hose with the third flow blocking element;

moving a fourth flow blocking element into an open position in response to input from the user via the user interface;

permitting flow of the commodity through a fourth hose with the fourth flow blocking element; and moving the commodity from the hopper through the fourth hose to the ground surface.

12. The method of claim 11, further comprising partially closing the fourth flow blocking element to thereby adjust a flow rate through the fourth hose.

13. The method of claim 12, further comprising moving the commodity through a splitter upstream of the first hose and the second hose, such that the flow of commodity that moves through the splitter is inhibited through the first hose and permitted through the second hose.

14. A control system comprising:
a user interface configured to receive an input from a user; and
a controller in communication with the user interface such that in response to the input from the user, the controller is configured to
send a first signal to a first actuator to unlock a first lock,
send a second signal to a first ground-engaging implement to move the first ground-engaging implement into a stowed position,
send a third signal to the first actuator to lock first lock to retain the first ground-engaging implement in the stowed position,
send a fourth signal to a first flow blocking element to inhibit flow through a first hose with a flow blocking element,
send a fifth signal to a second actuator to unlock a second lock,
send a sixth signal to a second ground-engaging implement to move the second ground-engaging implement into a deployed position,
send a seventh signal to the second actuator to lock the second lock to retain the second ground-engaging implement in the deployed position, and
send an eighth signal to a second flow blocking element to permit flow through a second hose around the flow blocking element.

15. The control system of claim 14, wherein the second signal is sent to a third actuator configured to move the first ground-engaging implement between the stowed and a deployed position.

16. The control system of claim 15, wherein the sixth signal is sent to a fourth actuator configured to move the second ground-engaging implement between a stowed and the deployed position.

17. The control system of claim 14, wherein the controller is further configured to send a ninth signal to the first flow blocking element to move the first flow blocking element to a partially-opened position, and configured to send a tenth signal to the second flow blocking element to move the second flow blocking element to a partially-opened position.

18. The control system of claim 14, wherein the controller is further configured to receive a first flow rate from a first meter indicative of a flow rate of commodity through the first hose, and to receive a second flow rate from a second meter indicative of a flow rate of commodity through the second hose, wherein the controller is further configured to send an eleventh signal to the user interface to display the first flow rate to the user and is configured to send a twelfth signal to the user interface to display the second flow rate to the user.

19. The control system of claim 18, wherein the controller is configured to adjust the first flow rate and the second flow rate in response to input from the user via the user interface, and wherein the user interface is positioned within a cab of a work vehicle such that an operator can engage the user interface from within the cab of the work vehicle.

20. The control system of claim 14, wherein the controller is further configured to send a thirteenth signal to move a third flow blocking element into a closed position in response to input from the user via the user interface to inhibit flow through a third hose with the third flow blocking element, and
send a fourteenth signal to move a fourth flow blocking element into an open position in response to input from the user via the user interface to permit flow through a fourth hose around the fourth flow blocking element.

* * * * *